United States Patent [19]

Kline et al.

[11] 4,046,338

[45] Sept. 6, 1977

[54] AIRFOIL FOR AIRCRAFT HAVING IMPROVED LIFT GENERATING DEVICE

[76] Inventors: Richard L. Kline, 10 Wright Place, Scarsdale, N.Y. 10583; Floyd F. Fogleman, 14 Drumlin Drive, Morris Plains, N.J. 07950

[21] Appl. No.: 622,097

[22] Filed: Oct. 14, 1975

[51] Int. Cl.² .............................................. B64C 3/38
[52] U.S. Cl. ................................................. 244/213
[58] Field of Search ................ 244/35 R, 35 A, 42 D, 244/42 DA, 42 DB, 42 DC, 40, 41, 42 R

[56] References Cited

U.S. PATENT DOCUMENTS

| 1,841,804 | 1/1932 | Hall | 244/42 DB |
| 2,271,226 | 1/1942 | Johnson | 244/42 D |
| 2,346,464 | 4/1944 | Tampier | 244/42 D |
| 3,706,430 | 12/1972 | Kline | 244/35 R |

FOREIGN PATENT DOCUMENTS

| 846,311 | 9/1939 | France | 244/42 D |
| 688,452 | 2/1940 | Germany | 244/42 D |
| 715,266 | 11/1941 | Germany | 244/42 DB |
| 272,455 | 12/1927 | United Kingdom | 244/42 D |

*Primary Examiner*—Trygve M. Blix
*Assistant Examiner*—Galen L. Barefoot
*Attorney, Agent, or Firm*—McAulay, Fields, Fisher & Goldstein

[57] ABSTRACT

An airfoil for an aircraft having a first surface extending between the leading edge and the trailing edge, and a second surface joined to the first along the leading edge and projecting rearwardly in the direction of said trailing edge. The second surface of the airfoil terminates materially in advance of the trailing edge to define a step-like discontinuity of the airfoil. One or more lift generating members are pivotally mounted on the second surface of the airfoil adjacent the step-like discontinuity. The lift generating members are selectively movable to various positions relative to the airstream to alter the aerodynamic forces on the airfoil during conditions of flight.

7 Claims, 9 Drawing Figures

AIRFOIL FOR AIRCRAFT HAVING IMPROVED LIFT GENERATING DEVICE

BACKGROUND OF THE INVENTION

1. Field of the Invention

This invention relates generally to an airfoil for aircraft, and more particularly, to an airfoil that has improved stability and performance characteristics through a wide range of airspeeds.

2. Description of the Prior Art

The present invention constitutes an improvement over applicants' previously patented unique airfoil disclosed in U.S. Pat. No. 3,706,430, dated Dec. 19, 1972, entitled AIRFOIL FOR AIRCRAFT. The airfoil of that patent included a wedge-like section formed by a continuous first surface which extended between the leading and trailing edges, and a second surface that was joined to the first surface along the leading edge. The second surface projected rearwardly in the direction of the trailing edge and terminated materially in advance thereof to define a step-like discontinuity of the airfoil. The thickness of the airfoil gradually increased from the leading edge to approximately 50% of the chord to form the wedge-like section, at which point, the second surface was sharply projected in the direction of the first surface to form the step-like discontinuity.

It was found from flight tests of small airplane models constructed having the above described airfoil, that the tested airfoil demonstrated unusually good lift, stability and pitching moment characteristics. For example, the airfoil greatly resisted stalling in that it was necessary to induce an angle of attach between 30° – 40° before the stall occurred, as distinguished from angle of attack values between 18° – 22° common to conventional airfoils. The technical explanation for such improved performance is unknown to the inventors and appears to be contrary to accepted aerodynamic theory. However, since the effect of stalling plays a significant role in accident reports, it is apparent that by resisting stalling, the above airfoil can materially increase the safety of flight.

Continued tests have shown that the patented airfoil has a poor glide ratio in the range between 3:1 – 4:1. While various lift generating devices, such as flaps, are known to be employed on conventional airfoils to increase the glide ratio such flaps are commonly mounted at the trailing edge of the airfoil. However, the use of such flaps on applicants' airfoil is not practical due to the relative thinness of said airfoil at its trailing edge. Furthermore, the portion of the airfoil downstream of the step is not intended to be used for housing auxiliary equipment, such as flaps, that would tend to eliminate or markedly reduce the aerodynamic effect of the step-like discontinuity.

During the course of further tests, applicants decided to place a lift generating member, such as a flap, adjacent the step-like discontinuity of the airfoil. As a general matter, the placement of a flap on either the top or lower surface of an airfoil is well-known wherein such flaps serve as spoilers to decrease the lift and increase the drag. However, contrary to applicants' expectation, the placement of a flap adjacent the step-like discontinuity of the airfoil produced increased lift when the flap was moved to an extended or deflected position in the airstream. Thus, applicants have improved their previously patented airfoil by incorporating therein lift generating means to increase the glide ratio thereof.

As used herein, the term airfoil is defined as a body, such as an airplane wing, designed to provide a desired reaction force when in motion relative to the surrounding air.

Applicants' improved airfoil is to be distinguished from a class of airfoils designated as being "supercritical." In this regard, all airfoils have a characteristic known as critical Mach number (Mcr) which is the air speed ratioed to the speed of sound (Mach 1) at which the flow over some portion of the airfoil just reaches Mach 1. Airfoils usually are designed to fly below their critical Mach number because of the high drag rise caused by the formation of shock waves and, possibly, flow separation associated with super-critical speeds. However, the supercritical airfoil is capable of flying close to the speed of sound (Mach 1) without experiencing the high drag rise associated with more conventional shapes.

The conventional airfoil, particularly one designed to operate in the subsonic speed range, has cambered surfaces that define a profile of gradually decreasing thickness from the leading edge to the trailing edge. The supercritical airfoil has a much flatter shape of the upper surface thereof which reduces both the extent and strength of the shock wave, as well as the adverse pressure rise behind the shock wave, with corresponding reductions in drag. To compensate for the reduced lift of the upper surface of the supercritical airfoil resulting from the reduced curvature, the airfoil has increased camber near the trailing edge. This is to be distinguished from applicants' unique airfoil which has substantially no camber at the trailing edge. Furthermore, the supercritical airfoil does not provide for any step-like discontinuity as incorporated in applicants' airfoil.

Applicants unique airfoil is also to be distinguished from those incorporating leading edge extensions and fences, such as shown and disclosed in U.S. Pat. No. 2,802,630, dated Aug. 13, 1957 entitled WING LEADING EDGE DEVICE. The use of such extensions apparently has value in the design of sweptback wings in obtaining a more perfect airflow over the outboard portion of the wing. Applicants' improved airfoil, as will become more apparent hereinafter, is directed toward the use of lift generating members located in the region of the step-like discontinuity to improve the aerodynamic characteristics thereof.

SUMMARY OF THE INVENTION

The improved airfoil of the present invention provides for a first surface extending between the leading and trailing edges and a second surface joined to the first surface along the leading edge and projecting rearwardly in the direction of the trailing edge. The second surface of the airfoil terminates materially in advance of the trailing edge to define a step-like discontinuity of the airfoil similar to that embodied in applicants' previously patented airfoil disclosed in U.S. Pat. No. 3,706,430 and referred to above.

One or more lift generating members, such as flaps, are pivotally mounted on the second surface of the airfoil adjacent the step-like discontinuity. The lift generating members are selectively movable to various positions relative to the airstream to alter the aerodynamic forces on the airfoil during conditions of flight.

In another embodiment of the invention, a movable cover member is pivotally mounted to the airfoil, and has an outer surface extending from the step-like discontinuity to the trailing edge of said airfoil. The cover member is selectively movable to various positions relative to the second surface to further alter the aerodynamic forces acting on the airfoil during conditions of flight.

Accordingly, an object of the present invention is to provide an improved airfoil for aircraft having movable lift generating members mounted thereon to improve performance characteristics though a wide range of airspeeds.

Another object and feature of the present invention is to provide an improved airfoil for aircraft having lift generating members mounted thereon and selectively movable to increase the glide ratio.

The above and other objects, features and advantages of the present invention will become more apparent from a full consideration of the following detailed description when taken in conjunction with the accompanying drawings.

DESCRIPTION OF THE PREFERRED EMBODIMENTS

Figure 1:
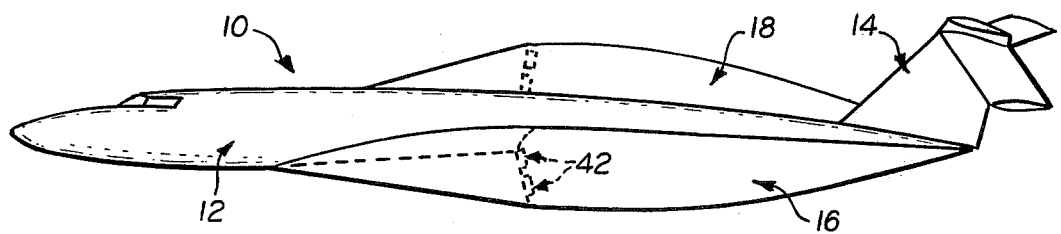
FIG. 1 is a side view, partly in perspective, of an aircraft having airfoils constructed in accordance with the present invention.
Figure 2:
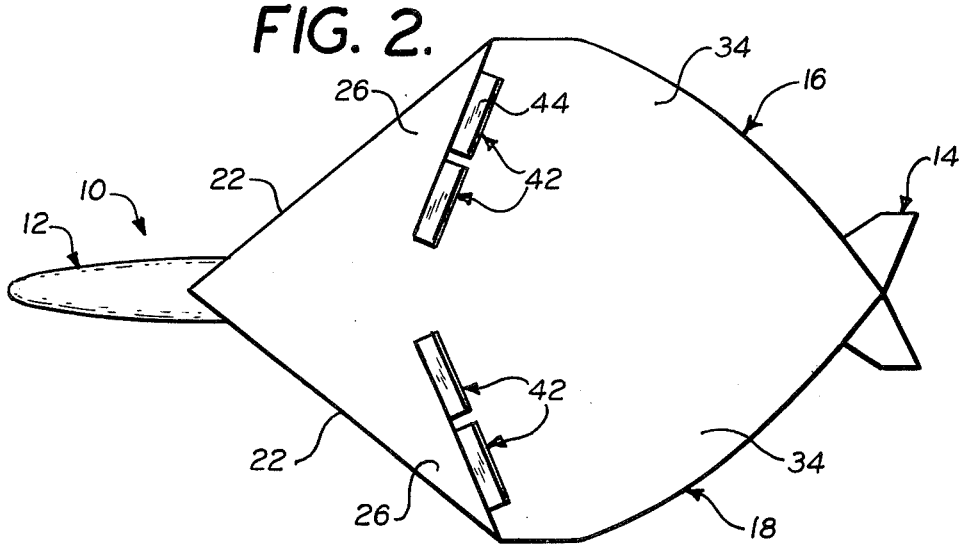
FIG. 2 is a bottom plan view of the aircraft illustrated in FIG. 1, showing the location of the lift generating devices on the airfoils.

Referring to the drawings, particularly FIGS. 1,2,3 and 8, numeral 10 represents an aircraft having airfoils constructed in accordance with the present invention. Aircraft 10 comprises a conventional streamlined fuselage 12 with empennage designated generally by numeral 14, and sweptback wings 16 and 18 that constitute the improved airfoils of the invention. The lateral edges of the wings converge toward the rear of the fuselage so that as viewed from the bottom, the composite area of the wings is of generally diamond configuration as illustrated in FIG. 2. However, it will be appreciated that the illustrated configuration may be altered and is not to be deemed a limitation on the invention. Other conventional portions or components of the aircraft, such as the location and type of engines, landing gear, etc., are omitted from the drawings for the purpose of clarity in that they do not form part of the invention.

Figure 7:
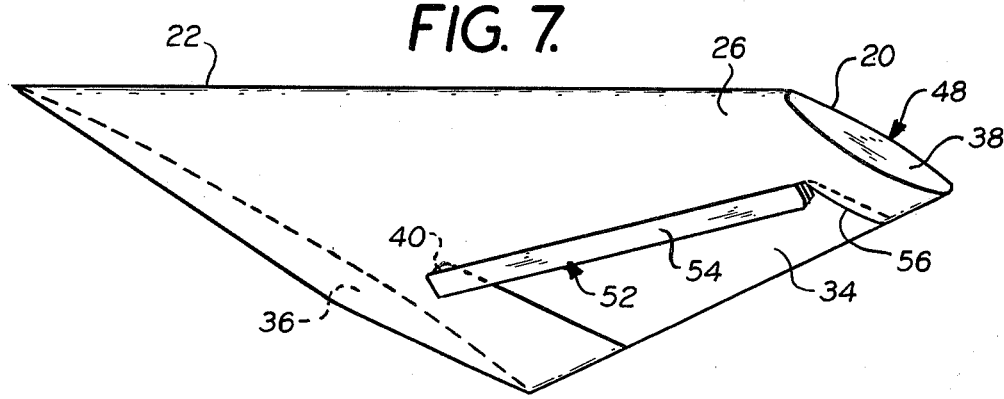
FIG. 7 is a view similar to FIG. 6 illustrating another embodiment of the invention.
Figure 8:
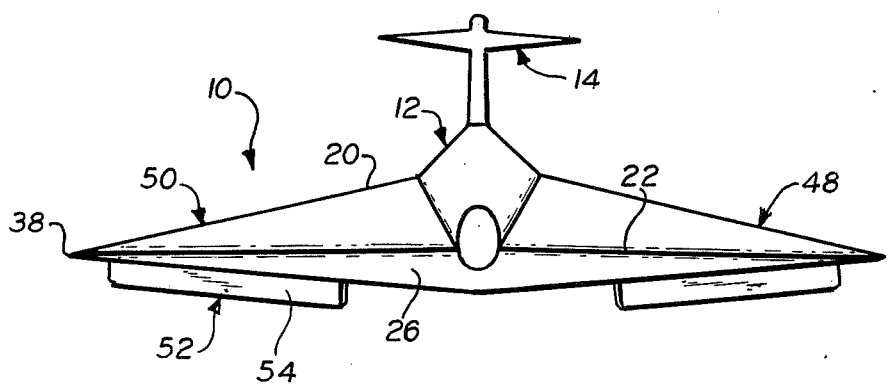
FIG. 8 is a view similar to FIG. 3 illustrating the airfoil embodiment of FIG. 7 mounted on the aircraft.

The structure and overall general configuration of wings or airfoils 16, 18 is essentially similar to that of applicants' previously patented airfoil disclosed in U.S. Pat. No. 3,706,430, and the subject matter thereof is incorporated herein by reference. More specifically, and with reference to FIGS. 3 - 9 herein, the airfoils for any disclosed embodiment of the invention extend outwardly from fuselage 12 and are of identical construction when viewed in cross section from the leading edge to the trailing edge. In other words, the airfoils 16, 18 associated with the aircraft of FIGS. 1 - 6 are identical in construction and the corresponding airfoils associated with the aircraft of FIGS. 7 and 8 are also identical in construction. However, the respective airfoils of the aircraft in said FIGURES represent different embodiments of the invention.

FIGS. 1 - 6 illustrate one airfoil embodiment 16, 18 of the invention. In this regard, since airfoils 16, 18 are identical, it will be appreciated that the description and illustration relative to one of said airfoils is applicable equally as well to the other one of said airfoils. Referring to the FIGURES, airfoil 18 is constructed having a first surface 20 extending between the leading edge 22 and the trailing edge 24 of the airfoil. A second surface 26 is joined to the first surface 20 along the leading edge 22, and projects rearwardly in the direction of trailing edge 24. The arrangement is such that surfaces 20 and 26 are in diverging relation to define a wedgeshape represented by numeral 28. Second surface 26 terminates materially in advance of the trailing edge 24 to define a steplike discontinuity of the airfoil represented generally by numeral 30. The riser portion 32 of step 30 serves to connect the second surface 26 of the airfoil to a third surface 34 which extends from the step to the trailing edge 24. Airfoil 18 has a span-wise dimension defined by the distance between its root end 36 and its tip end 38. The step-like discontinuity 30 extends span-wise of airfoil 18 and has an end edge 40 terminating in advance of the root end 36 of said airfoil. This construction permits the wing to have sufficient depth or thickness over much of its chord-wise dimension adjacent its root end to accomodate the landing gear assembly or other auxiliary equipment.

Figure 3:
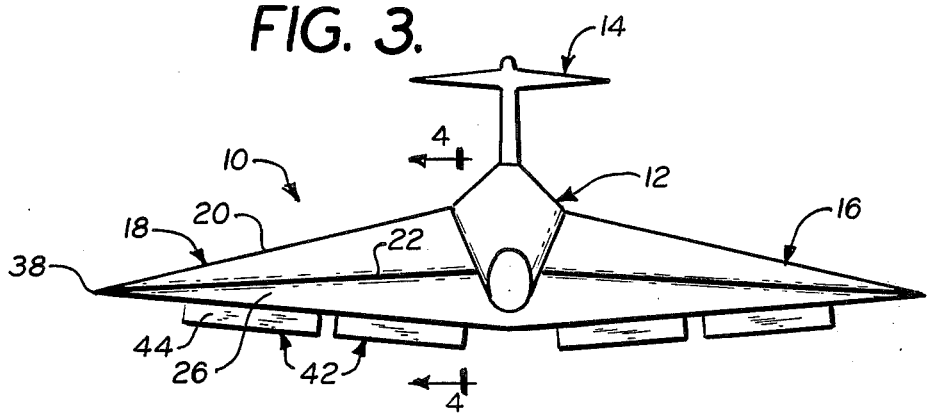
FIG. 3 is a front elevational view of the aircraft illustrated in FIG. 1, showing the lift generating devices in their extended positions.

In the preferred embodiment, the first surface 20 defines the upper contour of airfoil 18 whereas the second and third surfaces 26, 34 define the lower contour thereof. The view in FIG. 3 shows the upper wing surface, as well as the lower surface of the wedge, as being substantially planar. Furthermore, as shown in FIG. 2, the lower surfaces of airfoil 18 merge with the corresponding lower surfaces of airfoil 16 which project outwardly from the opposite side of fuselage 12.

In accordance with the teachings of the invention, lift generating means, represented generally by numeral 42, are provided on the second surface 26 of airfoil 18 adjacent the step-like discontinuity 30. Lift generating means 42 is preferably a flap-like member 44 pivotally mounted on airfoil 18 in conventional manner to project rearwardly of the step. Flap 44 is disposed for movement between a first position in which the outer surface 46 forms a smooth continuation of airfoil surface 26, a second position in which said outer surface 46 projects outwardly of said airfoil in the direction away from airfoil surface 34, and a third position in which said outer surface 46 projects inwardly of said airfoil in the direction toward said airfoil surface 34.

Figure 4:
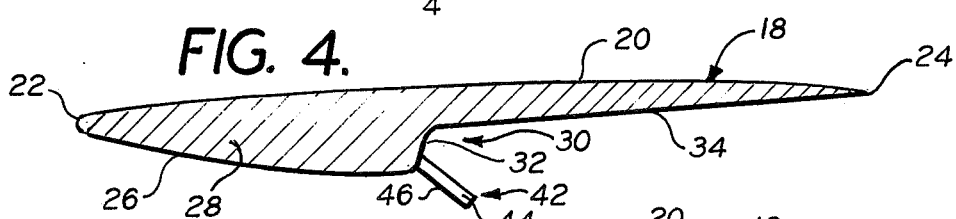
FIG. 4 is a cross-sectional view of one of the airfoils taken along line 4—4 of FIG. 3.
Figure 5:
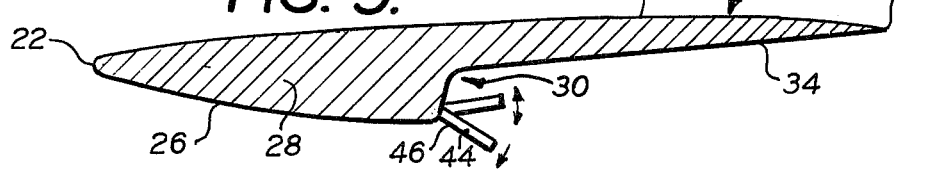
FIG. 5 is a view similar to FIG. 4 showing the lift generating devices disposed for movement between various positions.
Figure 6:
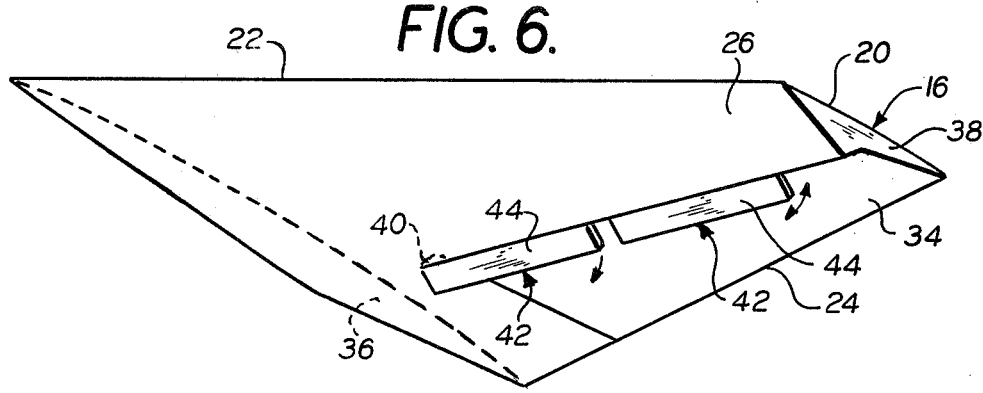
FIG. 6 is a perspective view of one of the airfoils, removed from the aircraft, showing the location of the lift generating devices.

FIG. 4 illustrates flap 44 in its second position corresponding to when the flap is moved to an extended position in the airstream. FIG. 5 shows the flap 44 disposed for movement between its first, second or third positions, which movement is represented by the arrow indicia. Although movement of flap 44 to its third position may serve to reduce any turbulent airflow downstream of the wedge by permitting smoother flow over the step-like discontinuity 30, the primary importance of flap movement is toward its second position which produces increased lift thereby improving the glide ratio of applicants' previously patented airfoil. Accordingly, the invention herein provides for the range of movement of flap 44 from its first position to its second position to be greater than the range of movement of said flap from its first position to its third position. For example, whereas the range of movement of flap 44 from its first position to its second position may be in the order of 30°, the range of movement of said flap from its first position to its third position will be in the order of only 10°.

As is apparent from the drawings, flap 44 is spaced from airfoil surface 34 to define an open zone of said airfoil which is bounded on three sides by the inner surface of flap 44, the riser portion 32 of step 30 and a portion of the airfoil surface 34. The arrangement is such that the zone is always open regardless of whether the flap 44 is in its first position, second position or third position.

The embodiment of FIGS. 1 - 6 provides for the lift generating means 42 to comprise a plurality of flap members 44 disposed in laterally spaced relation on each of said airfoils 16, 18 whereby each of said flaps 44 may be selectively disposed for movement between their respective positions. In other words, the flaps 44 on each airfoil may be operatively connected to move separately or in unison, as desired. Thus, for example, as viewed in FIG. 3, the inboard flaps 44 may be operatively connected to move in unison to their respective second positions to improve the glide ratio of the airfoils, whereas the outboard flaps 44 may be operatively connected to move separately to a selective position relative to the airstream to further alter the aerodynamic forces on the airfoils during conditions of flight. Accordingly, one or more of the lift generating membes may be selectively moved and used in a manner similar to that of ailerons to increase the lift on only one of the airfoils, such as in executing a bank or turn maneuver of the aircraft.

FIGS. 7 and 8 disclose another embodiment of the invention wherein the improved airfoils are designated by numerals 48 and 50, each having lift generating means 52 located adjacent the step-like discontinuity. In this regard, those portions of airfoils 48, 50 which are common to corresponding portions of airfoils 16, 18 are designated by the same reference numerals, and further description of such correspondingly similar portions is not deemed necessary. Lift generating means 52 comprises a single flap-like member 54 pivotally mounted in conventional manner on the second surface 26 of airfoils 48, 50, and disposed to project rearwardly of the step-like discontinuity. The flap 54 is disposed for movement between positions corresponding to those positions previously referred to in connection with the lift generating flaps 44 of airfoils 16, 18. Furthermore, as shown in FIG. 7, the step-like discontinuity extends span-wise of airfoil 48 and has end edges 40, 56 terminating in advance of the root end 36 and tip end 38, respectively, of the airfoil. It will be appreciated that flaps 54 may be operatively connected to move separately or in unison, as desired, in the manner similar to that of the corresponding flaps 44 of the embodiment of FIGS. 1 - 6.

Figure 9:
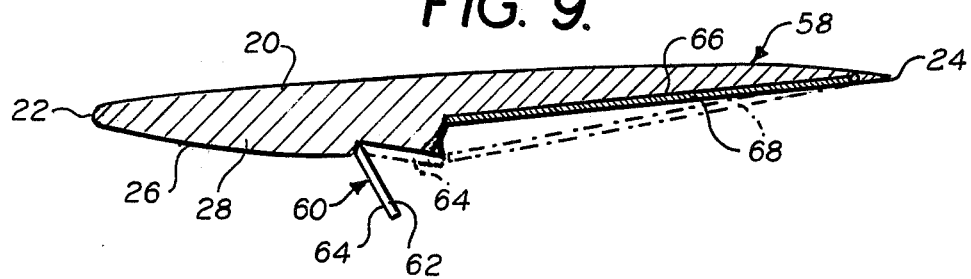
FIG. 9 is a view similar to FIG. 4 illustrating another embodiment of the invention.

FIG. 9 discloses another embodiment of the invention wherein the improved airfoil is designated by numeral 58, and is constructed having lift generating means 60 in the form of a flap-like member 62 pivotally mounted on the second surface 26 of the airfoil adjacent the step-like discontinuity. Here again, those portions of airfoil 58 which are common to corresponding portions of airfoils 16, 18 are designated by the same reference numerals. However, in this embodiment of the invention, the second surface 26 of the airfoil terminates short of the steplike discontinuity, and the outer surface 64 of flap 62 constitutes an extension of said second surface 26 to form the terminal end portion thereof. In other words, flap 62 is disposed for movement between first and second positions corresponding to those positions previously referred to in connection with the lift generating flap 44. Thus, when flap 62 is in its first position, as illustrated by the phantom line drawing in FIG. 9, the outer surface 64 forms a smooth continuation of the second surface 26 of the airfoil, which outer surface 64 extends chord-wise to the step-like discontinuity.

The airfoil embodiment of FIG. 9 further comprises a movable cover member 66 pivotally mounted on airfoil 58 adjacent the trailing edge 24. Cover 66 has an outer surface 68 that extends chord-wise from the step-like discontinuity to the trailing edge of the airfoil. Cover member 66 also has a spanwise dimension substantially co-extensive with the corresponding span-wise dimension of the step-like discontinuity. The cover is disposed for movement between a first position, as illustrated by the cross-line drawing, in which the outer surface 68 is off-set relative to the second surface 26 of the airfoil, and a second position, as illustrated by the phantom-line drawing, in which the outer surface 68 forms a substantially smooth continuation of said airfoil second surface 26 to eliminate the effect of the step-like discontinuity. In this regard, there may be instances where it is preferable to move the cover member 66 to its second position to reduce any turbulent airflow downstream of the wedge by permitting smoother flow over the step-like discontinuity.

The pivotal mounting arrangement for cover 66, as well as for the lift generating means 42, 52 and 60, have not been shown in detail since such mounting techniques are conventional and well-known in the prior art. Furthermore, although the invention is shown applied to airfoils of aircraft, it will be appreciated that the invention has application as well to other types of vehicles having airfoil-like components. Accordingly, there is now provided an improved airfoil having lift generating members selectively movable to various positions relative to the airstream to alter the aerodynamic forces on the airfoil during conditions of flight. Furthermore, in another embodiment of the invention, a cover member is pivotally mounted on the airfoil and is selectively movable to various positions to reduce the effect of the step-like discontinuity to further alter the aerodynamic forces acting on the airfoil.

While preferred embodiments of the invention have been shown and described in detail, it will be readily understood and appreciated that numerous omissions, changes and additions may be made without departing from the spirit and scope of the present invention.

What is claimed:
1. An airfoil comprising:
   a. a first surface extending between the leading edge and the trailing edge of said airfoil;
   b. a second surface joined to said first surface along said leading edge and projecting rearwardly in the direction of said trailing edge, said first and second surfaces being in diverging relation to each other;

c. said second surface terminating materially in advance of said trailing edge to define a step-like discontinuity representing a riser portion of said airfoil, said riser portion projecting in the direction of said first surface and terminating in advance thereof; and d. a third surface connecting the terminal end of said riser portion to the trailing edge of said airfoil;

e. lift generating means pivotably mounted on the terminal end portion of said second surface and projecting rearwardly of said step-like discontinuity, said means comprising a member disposed for movement between a first position in which the outer surface of said member forms a smooth continuation of said second surface and a second position in which said outer surface projects outwardly of said airfoil in the direction away from said third surface; and f. said lift generating means being spaced from said third surface to define an open zone of said airfoil bounded by the inner surface of said member, said riser portion and said third surface; said zone being open in all positions of said member.

2. The airfoil as recited in claim 1, wherein said first surface defines the upper contour of said airfoil and said second surface defines a portion of the lower contour of said airfoil.

3. The airfoil as recited in claim 1, wherein said airfoil has root and tip ends, and said step-like discontinuity extends span-wise of said airfoil and has an end edge terminating in advance of the root end of said airfoil.

4. The airfoil as recited in claim 1, wherein said airfoil has root and tip ends, and said step-like discontinuity extends span-wise of said airfoil and has end edges terminating in advance of the root and tip ends.

5. The airfoil as recited in claim 1, wherein said lift generating means comprises a plurality of said members in laterally spaced relation, each of said members having an outer surface selectively disposed for movement between said first and second positions.

6. The airfoil as recited in claim 1, wherein said lift generating member is disposed for movement to a third position in which the outer surface of said member projects inwardly of said airfoil in the direction toward said third surface.

7. The airfoil as recited in claim 6, wherein the range of movement of said member from its first position to its second position is greater than the range of movement of said member from its first position to its third position.

* * * * *